United States Patent
Kolblin et al.

(10) Patent No.: US 8,751,704 B2
(45) Date of Patent: Jun. 10, 2014

(54) METHOD FOR OPERATING A FIELDBUS INTERFACE

(75) Inventors: Robert Kolblin, Lorrach (DE); Michael Maneval, Schopfheim (DE); Axel Poschmann, Basel (CH); Jorg Reinkensmeier, Steinen (DE)

(73) Assignee: Endress + Hauser Process Solutions AG, Reinach (CH)

( * ) Notice: Subject to any disclaimer, the term of this patent is extended or adjusted under 35 U.S.C. 154(b) by 101 days.

(21) Appl. No.: 13/496,965

(22) PCT Filed: Aug. 30, 2010

(86) PCT No.: PCT/EP2010/062612
§ 371 (c)(1),
(2), (4) Date: Mar. 19, 2012

(87) PCT Pub. No.: WO2011/042258
PCT Pub. Date: Apr. 14, 2011

(65) Prior Publication Data
US 2012/0185625 A1 Jul. 19, 2012

(30) Foreign Application Priority Data
Oct. 6, 2009 (DE) .......................... 10 2009 045 384

(51) Int. Cl.
*G06F 3/0484* (2013.01)
*G06F 3/00* (2006.01)
(52) U.S. Cl.
USPC ............. 710/55; 710/2; 710/5; 710/8; 710/15

(58) Field of Classification Search
None
See application file for complete search history.

(56) References Cited

U.S. PATENT DOCUMENTS

| 2005/0066104 A1 | 3/2005 | Train et al. |
| 2009/0018672 A1* | 1/2009 | Gienke ............................ 700/1 |

FOREIGN PATENT DOCUMENTS

| DE | 19831405 A1 | 1/2000 |
| DE | 102005063053 A1 | 7/2007 |
| DE | 102008019053 A1 | 10/2009 |
| DE | 102008045590 B3 | 1/2010 |
| EP | 1353246 B1 | 10/2003 |

OTHER PUBLICATIONS

German Search Report in corresponding Application No. 10 2009 045 384.9, dated Apr. 29, 2010.
International Search Report in corresponding International Application No. PCT/EP2010/062612, dated Aug. 11, 2011.
English translation of the IPR.

* cited by examiner

*Primary Examiner* — Scott Sun
(74) *Attorney, Agent, or Firm* — Bacon & Thomas, PLLC

(57) ABSTRACT

A method for operating a fieldbus interface (FI) connected to a fieldbus of process automation technology. The method includes the following: tapping data traffic on the fieldbus by the fieldbus interface; and registering tapped configuration information relative to cyclic data traffic on the fieldbus by the fieldbus interface.

10 Claims, 2 Drawing Sheets

METHOD FOR OPERATING A FIELDBUS INTERFACE

TECHNICAL FIELD

The present invention relates to a method for operating a fieldbus interface, which is connected to a fieldbus in process automation technology.

BACKGROUND DISCUSSION

In process automation technology, field devices are often applied to serve for registering and/or influencing process variables. Sensors such as, for example, fill level measuring devices, flow measuring devices, pressure and temperature measuring devices, pH-redox potential measuring devices, conductivity measuring devices, etc. serve for registering the corresponding process variables, fill level, flow, pressure, temperature, pH value, and conductivity, respectively. Actuators such as, for example, valves or pumps, via which the flow of a liquid in a pipeline section or the fill level in a container can be changed, serve for influencing process variables. In principle, all devices, which are applied near to the process and deliver or process information relevant to the process, are referred to as field devices. A large number of such field devices are available from the firm, Endress+Hauser.

In modern industrial plants, field devices are, as a rule, connected via bus systems (Profibus®, Foundation® Fieldbus, HART®, etc.) to superordinated units. Normally the superordinated units are control systems or control units, such as, for example, a PLC (programmable logic controller). Among other things, the superordinated units serve for process control, process visualizing, process monitoring as well as for the start up of field devices.

In the start up of a plant, a superordinated unit performs the system configuration by means of an engineering program (engineering software), which is loaded into the superordinated unit. In such case, the superordinated unit especially performs the configuration of the individual field devices associated with the superordinated unit. In such a configuration, among other things, it is determined, which outputs the superordinated unit provides to the individual field devices associated with the superordinated unit in the context of process control and which inputs are obtained by the superordinated unit from the individual field devices associated with the superordinated unit in the context of process control.

Computer supported systems, through which asset management, state monitoring (condition monitoring), and/or plant monitoring are performed, are frequently applied in plants using process automation technology. Such systems are often embodied separately from a superordinated unit, which, among other things, serves in a fieldbus segment for process control. Frequently, they are connected to a superordinated (to the fieldbus segment) company network (for example, an Ethernet® network). In this way, these systems can be comprehensively applied for a number of fieldbus segments.

Such systems often require, for the execution of their services, configuration information relative to the cyclic data traffic on each fieldbus. For example, configuration information relative to the cyclic data traffic of each fieldbus is required, in order to be able to evaluate telegrams, which in the context of process control, are transmitted via the fieldbus between a superordinated unit and at least one field device associated with the superordinated unit. In such case, it is problematic that the computer supported systems described above, when these are embodied separately from a superordinated unit (e.g. a PLC), often have no access to the required configuration information relative to the cyclic data traffic on the fieldbus. This is especially the case when the computer supported systems are from a manufacturer different from the manufacturer of each superordinated unit.

A method for monitoring a plant, in which a number of field devices communicate via a fieldbus with a process control unit and a plant monitoring unit, such as, for example, a gateway, is known from WO 2007/074105 A2. The plant monitoring unit checks, in such case, the regular data traffic for information indicating a diagnostic event in one of the field devices. If a telegram with an indication of a diagnostic event is detected, other diagnostic information of the relevant field device is requested by the plant monitoring unit.

SUMMARY OF THE INVENTION

An object of the present invention is to provide a method for a fieldbus of process automation technology, through which method, external systems, which execute services in reference to the fieldbus, can be provided configuration information relative to the cyclic data traffic on the fieldbus.

The object is achieved by a method for operating a fieldbus interface as well as by a fieldbus interface.

In the present invention, a method is provided for operating a fieldbus interface connected to a fieldbus of process automation technology. The method has, in such case, steps as follows:

A) Tapping data traffic on the fieldbus by the fieldbus interface; and

B) registering tapped configuration information relative to cyclic data traffic on the fieldbus by the fieldbus interface.

Since the fieldbus interface taps the data traffic on the fieldbus, it taps all information transmitted via the fieldbus between a superordinated unit and the field devices associated with the superordinated unit. Especially, it also taps the configuration information relative to the cyclic data traffic on the fieldbus. This configuration information is especially transmitted via the fieldbus between a superordinated unit and the field devices associated with the superordinated unit during an initializing phase. Accordingly, the fieldbus interface can, in simple manner, register configuration information relative to the cyclic data traffic on the fieldbus. The fieldbus interface can additionally provide this configuration information to external systems, which, for example, are embodied separately from a superordinated unit and which perform services in reference to the fieldbus. Such external systems can be, for example, intelligent applications, which require configuration information relative to the cyclic data traffic on the fieldbus for the execution of their services. Additionally, the configuration information registered in a fieldbus interface can be played back in the case of need, for example, in laboratories for searching for errors or for optimizing the plant.

In such case, the fieldbus interface does not require a fixedly configured, permanent fieldbus address for performing the steps of tapping and registering, so a complex parametering of the fieldbus interface is not required. Also, the bus traffic on the fieldbus is not supplementally burdened by the fieldbus interface.

In performing the method of the invention, the tapped information, which is transmitted in corresponding telegrams via the fieldbus, is checked by the fieldbus interface especially to determine whether it is configuration information to be registered relative to the cyclic data traffic on the fieldbus. If this is the case, then the information is registered by the fieldbus interface (step B).

The terminology, 'fieldbus interface', means herein a module, which is embodied for connection to a fieldbus and through which information, which is communicated via the fieldbus, can, at least partially, be provided to a communication unit embodied separately from the fieldbus interface. In reference to network structure, the communication unit can especially be superordinated to the fieldbus, so that it forms a superordinated communication unit. Additionally, the communication unit can be directly connected to the fieldbus interface via a superordinated network (e.g. an internal company Ethernet LAN (LAN: Local area network)) or via another communication connection (e.g. a USB interface). In given cases, a protocol conversion also occurs via the fieldbus interface, as is the case with a gateway.

The method steps of the method of the invention as well as the method steps of the further developments are, so far as this is technically sensible, preferably performed automatically by correspondingly installed software and/or hardware of the fieldbus interface.

In addition to the mentioned configuration information, which concerns the configuration of the cyclic data traffic on the fieldbus, other tapped information can also be registered by the fieldbus interface. This can be sensible, for example, when external systems, such as, for example, a separately embodied communication unit and/or the fieldbus interface itself require(s) other information transmitted via the fieldbus. Additionally, the fieldbus interface can also provide yet other functions.

Preferably, the fieldbus interface only taps data traffic on the fieldbus and performs no communication via the fieldbus. In this way, as explained above, only a small effort must be expended for inserting the fieldbus interface into a fieldbus. To the extent that it is required for the fulfillment of further functions, the fieldbus interface can, however, also be embodied and parametered in such a manner that it can perform communication via the fieldbus.

In a further development, the configuration information includes, relative to the cyclic data traffic on the fieldbus, information concerning the outputs, which, in the context of process control, are delivered from a superordinated unit to a field device associated with the superordinated unit, and/or information concerning the inputs, which, in the context of process control, are obtained by a superordinated unit from a field device associated with the superordinated unit. Since this information is registered by the fieldbus interface in the registering step (step B), a computer supported, external system (e.g. a communication unit embodied separately from the fieldbus interface) can, with the assistance of this configuration information, evaluate telegrams, which, in the context of process control, are transmitted via the fieldbus between a superordinated unit and the field devices associated with the superordinated unit. In the context of process control, without this configuration information, the meaning and the relationship of the values transmitted in the individual telegrams would not be able to be understood by a computer supported external system.

Especially with a fieldbus using the Profibus® standard, this configuration information indicates, relative to the inputs and outputs of the superordinated unit, how many bytes are sent as outputs from the superordinated unit (master) to a field device (slave) associated with the superordinated unit in performing the process control and how many bytes are received as inputs by the superordinated unit (master) from a field device (slave) associated with the superordinated unit in performing the process control. Additionally, especially with modular Profibus field devices, it is determined by the configuration of such field devices, which modules or module (of a number of possible modules) are/is actually used in the application of the field device. Depending on the selection of modules, the number of bytes of the outputs obtained by the superordinated unit and/or the inputs sent by the superordinated unit change accordingly.

In the case of a fieldbus using the Profibus® standard, the process control proceeds, for example, as follows: A superordinated unit, such as, for example, a PLC, which forms a master class 1 (in the following MC1), performs a process control in reference to the field devices, which are associated with the superordinated unit and, in each case, form the slaves. In a cycle (i.e. in the context of a cyclic communication), measured values are requested, following predetermined rules, by the superordinated unit from the individual sensors of the fieldbus associated with the superordinated unit and as a function of the obtained measured values, control commands to the individual actuators associated with the superordinated unit are output by the superordinated unit. In such case, the telegrams used are especially referred to as "Data_Exchange telegrams". If all field devices associated with the superordinated unit are processed in this manner, then the cycle is ended. After terminating a cycle, the superordinated unit passes the token to an additional MC1 or to an MC2 (master class 2), to the extent that at least one such MC1 or MC2 is connected to the fieldbus. Thus, it can also be provided that more than only one superordinated unit is provided on a fieldbus.

"Field device" does not exclusively refer to sensors and/or actuators. Rather, any units, which are directly connected to the fieldbus and serve for communication with a superordinated unit (e.g. a PLC), such as e.g. remote I/Os, gateways or linking devices, are also referred to as field devices.

In a further development, the configuration information includes, relative to the cyclic data traffic on the fieldbus, information concerning device parameters, especially frequency of the alternating current grid applied for supplying devices connected to the fieldbus. Also, this configuration information can be required for a computer supported, external system (e.g. a communication unit embodied separately from the fieldbus interface) for the execution of the respective services. Depending on nation, the frequency of the alternating current grid can especially be 50 or 60 Hz (Hertz). In the case of individual devices, especially field devices, the frequency of the applied alternating current grid must be given in the configuration of each field device, since for the use of the devices, among other things, their filter settings are to be adapted correspondingly.

In a further development, registered configuration information relative to the cyclic data traffic on the fieldbus is stored by the fieldbus interface. Preferably, a corresponding memory, especially a buffer, is provided in the fieldbus interface. In this way, the configuration information, when required, can be queried by a computer supported external system, or on its own initiative (for example, corresponding to a predetermined control or dependent on situation) be provided by the fieldbus interface to a computer supported external system. The fieldbus interface can store the configuration information directly or also in a prepared or further processed form. Additionally, the fieldbus interface can collect the configuration information of the individual field devices connected to the fieldbus in a suitable table, so that query and understanding of the stored configuration information are facilitated. To the extent that other information (in addition to the configuration information mentioned) is also registered by the fieldbus interface, this additional information is preferably stored in a corresponding manner by the fieldbus interface.

In a further development, the data traffic on the fieldbus is continuously tapped by the fieldbus interface at least during an initializing phase of at least one field device connected to the fieldbus. In this way, it is assured that configuration information, which is transmitted between the field device and an associated superordinated unit during the initializing phase of the field device, can be tapped and registered by the fieldbus interface.

The 'initializing phase' refers to the phase, which a field device passes through, after a turning on or a reset of the same, in order to attain the communication state in which a cyclic data exchange with a superordinated unit can take place.

In a field device using the Profibus® standard, the communication states passed through during the initializing phase are described by the Profibus® state machine. In such case, a Profibus® field device can only first perform a cyclic data exchange with an associated superordinated unit, after it reaches the communication state DATA EXCHANGE (DX-CHG). In order to attain this communication state, the field device expects a sequence of telegrams from the superordinated unit and passes through, in such case, the different communication states of the Profibus® state machine. Particularly, the field device first receives a diagnostic query ("Slave_Diag query telegram") from the superordinated unit after a turning on (Power_ON) or after a reset; the field device transmits its diagnosis to the superordinated unit upon receipt of the diagnostic query. The field device is now in the communication state WPRM ("Wait parameter"). As a next step the superordinated unit transmits to the field device the parameter to be set ("Set_Prm query telegram"), wherein the field device then confirms the receipt to the superordinated unit. The field device then switches to the communication state WCFG ("Wait Configuration"). As a next step the superordinated unit transmits the configuration ("Chk_Cfg query telegram") for the field device to the field device, wherein the field device then confirms the receipt to the superordinated unit. Then, the superordinated unit again sends a diagnostic query ("Slave_Diag query telegram") to the field device, after which the field device transmits its diagnosis to the superordinated unit and confirms that the transmitted parameter and the transmitted configuration were accepted. Then, the field device switches to the communication state DXCHG ("Data Exchange"), so that, in the context of process control, a cyclic data exchange with the superordinated unit can take place.

As can be seen from the above description of the initializing phase of a Profibus® field device, the configuration information relevant to this field device, concerning the cyclic data traffic on the fieldbus, is transmitted during the initializing phase of a field device via the fieldbus. By tapping and registering such with the fieldbus interface, the configuration information can be provided to external systems.

In order for the fieldbus interface to be able to register configuration information as completely as possible, in reference to all field devices connected to a fieldbus and the associated, superordinated unit(s), it is preferably provided that the fieldbus interface continuously taps the data traffic on the fieldbus starting once the engineering program has been loaded into the respective superordinated unit. Thus, after the loading of the engineering program into the superordinated unit, the superordinated unit performs a system configuration. In such case, the superordinated unit especially performs a configuration of all field devices associated with the superordinated unit, so that the configuration information to be registered in reference to all associated field devices can be obtained by the fieldbus interface.

If the fieldbus interface is applied in an existing fieldbus (having at least one superordinated unit and associated field devices), preferably a reconfiguration of the plant is performed, which is achievable, for example, with a renewed loading of the engineering program into the superordinated unit. Fundamentally, a renewed configuration of the associated field devices by the superordinated unit can also be set in motion just by loading the network configuration anew into the superordinated unit. This network configuration is, however, most often contained in the engineering program and cannot be separately loaded into the superordinated unit.

In a further development, the method includes the following additional step:

C) transmitting registered configuration information relative to the cyclic data traffic on the fieldbus by the fieldbus interface to at least one communication unit, which is in communication with the fieldbus interface.

In this way, the registered configuration information can be provided to external systems, which require this information for the execution of their services. In such case, it is preferably provided that computer supported external systems, which require the configuration information for the execution of their services, also simultaneously form the communication unit. The communication unit can especially be connected to the fieldbus interface directly via a superordinated network (e.g. a company Ethernet LAN) or via another communication connection (e.g. a USB interface). Additionally, it is preferably provided that the communication unit forms a superordinated communication unit, which means that such is superordinated to the relevant fieldbus in reference to the network structure. Preferably, the transmission occurs upon request from the communication unit. Transmissions can also occur, however, on the initiative of the fieldbus interface.

In a further development of the invention, registered configuration information concerning the cyclic data traffic on the fieldbus is transmitted via the fieldbus interface to a computer supported, plant asset management system, a computer supported state monitoring system (condition monitoring) and/or a computer supported system for plant optimization.

A plant asset management system (PAM system) serves to keep the downtime of a plant, especially a plant using process automation technology, as small as possible. Additionally, the most comprehensive information possible concerning the assets installed in the plant are provided to a plant operator through such a PAM system. "Assets," in such case, are generally the parts of a plant representing value to the plant, such as, for example, the field devices installed in a plant. PAM systems, as a rule, manage a database containing information on the assets of a plant. In such case, a PAM system registers the assets installed in a plant, especially field devices, replacement of devices, changes to devices, such as, for example, the replacement of sensors, the implementing of a new software version, etc. and documents the time of each particular event. Especially, a PAM system is often arranged in such a manner that it regularly performs a network verification, in order to ascertain the information technology devices connected to a fieldbus. Additionally, performed maintenance tasks can be documented by a PAM system. An example of PAM system is the FieldCare® system of Endress+Hauser.

PAM systems are, as a rule, run by the plant operator. They are, in such case, often embodied separately from a superordinated unit (e.g. a PLC), which serves for process control, and are connected to a superordinated company network (for example, an Ethernet® network). In this way, among other things, the registering of the assets of a number of fieldbus segments can occur in a shared PAM system. Computer supported, state monitoring systems as well as computer supported systems for plant optimization are also embodied, as a rule, separately from a superordinated unit (e.g. a PLC) serving for process control and are connected to a superordinated company network (for example, an Ethernet® network). Additionally, common to these systems is that they often (depending on the concrete embodiment of the systems) have the need for configuration information relative to the cyclic data traffic on the respective fieldbusses for the execution of their services. Accordingly, in the present further development, such systems can each be provided, in a simple manner, the required configuration information relative to the cyclic data traffic on the fieldbus.

In an advantageous further development, the fieldbus is embodied according to the Profibus® standard (compare e.g. Profibus Profile Specification, Version 3.0). Alternatively, the fieldbus, however, can also be embodied according to another standard, such as, for example, the Foundation® Fieldbus Standard (see e.g. Foundation® Specification, Function Block Application Process, revision FS 1.7), etc.

In a further development, the fieldbus interface registers (in step B) the tapped configuration information, which is transmitted in a "Chk_Cfg telegram" and/or in a "Set_Prm telegram". As can be seen from the explanation of the initializing phase of a Profibus® field device above, configuration information relative to the cyclic data traffic on the fieldbus are especially transmitted in such a "Chk_Cfg telegram" and in such a "Set_Prm telegram". In addition, however, configuration information relative to the cyclic data traffic on the fieldbus transmitted in other telegram types can be registered by the fieldbus interface.

The present invention additionally relates to a fieldbus interface for connecting to a fieldbus of process automation technology, wherein the fieldbus interface is embodied in such a manner that through this the data traffic on the fieldbus can be tapped and the tapped configuration information relative to the cyclic data traffic on the fieldbus can be registered via the fieldbus interface.

Essentially, the advantages explained above in reference to the method of the invention are achievable by the fieldbus interface of the invention. Additionally, each further development explained in reference to the method of the invention is realizable in a corresponding manner, wherein the respective method steps, as far as this is sensible technically, are realizable through correspondingly installed software and/or hardware of the fieldbus interface.

BRIEF DESCRIPTION OF THE DRAWINGS

Other advantages and utilities of the invention will become evident based on the following description of examples of embodiments in reference to the appended drawing, the figures of which show as follows.

DETAILED DISCUSSION IN CONJUNCTION WITH THE DRAWINGS

Figure 1:
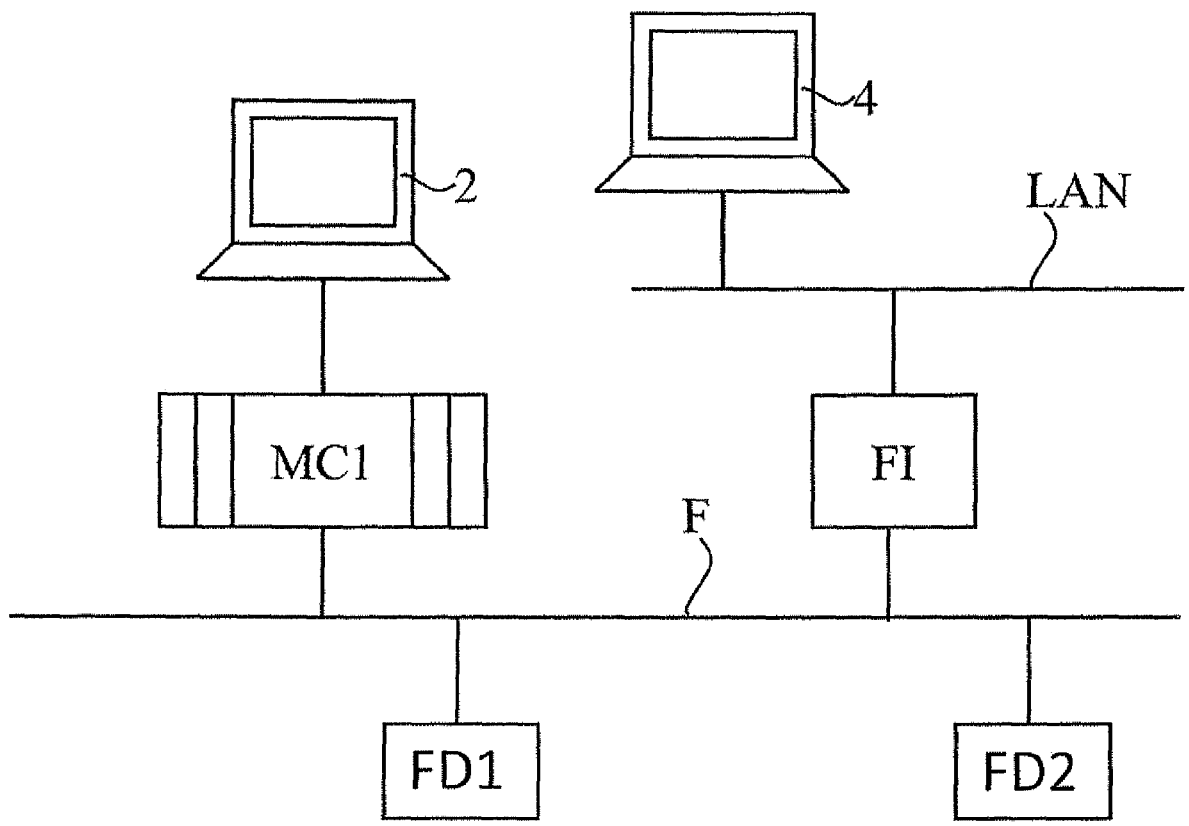
FIG. 1 shows for the purpose of explaining a form of embodiment of the invention, a schematic representation of a fieldbus segment, which is connected to a superordinated network via a fieldbus interface.

FIG. 1 shows, schematically, a fieldbus segment, in the case of which two field devices FD1 and FD2 as well as a superordinated unit MC1 are connected to a fieldbus F. Fieldbus F uses the Profibus® standard. Superordinated unit MC1, which is formed by a PLC here, is configured as a master class 1 (MC1), while the field devices FD1 and FD2 are slaves. Superordinated unit MC1 is connected to a computer 2, which serves as a visualizing system (for example, for the display of process parameters, etc.). Communication between superordinated unit MC1 and field devices FD1 and FD2 conforms to the Profibus® standard. In such case, the superordinated unit, in reference to field devices FD1 and FD2 (after an initializing of such), performs a process control, as was explained as an example above in the general part of the description.

Additionally, a fieldbus interface FI, which establishes a connection to a superordinated network LAN, is connected to fieldbus F. Superordinated network LAN is, for example, a local company network, which is embodied as an Ethernet LAN. In such case, the superordinated network LAN can also be connected to the World Wide Web. A PAM system 4, which forms a superordinated communication unit in reference to the network structure and relative to fieldbus interface FI, is connected to the superordinated network LAN.

As shown by the open-ended lines of fieldbus F as well as superordinated network LAN, still other devices and/or networks can also be connected to both fieldbus F and superordinated network LAN. Especially, supplementally or alternatively to the PAM system 4, a computer supported, state monitoring system and/or a computer supported system for plant optimization can also be connected to the superordinated network LAN. Additionally, superordinated network LAN can also be connected to additional fieldbusses.

As already explained in the general part of the description above, fieldbus interface FI taps the data traffic on fieldbus F during operation and registers the tapped configuration information relative to the cyclic data traffic on fieldbus F. The registered configuration information is stored in a memory of fieldbus interface FI. When PAM system 4 requires configuration information relative to the cyclic data traffic on fieldbus F for the execution of its services, it sends a corresponding request to fieldbus interface FI via the superordinated network LAN. In response thereto, fieldbus interface FI transmits the requested configuration information to PAM system 4.

Figure 2:
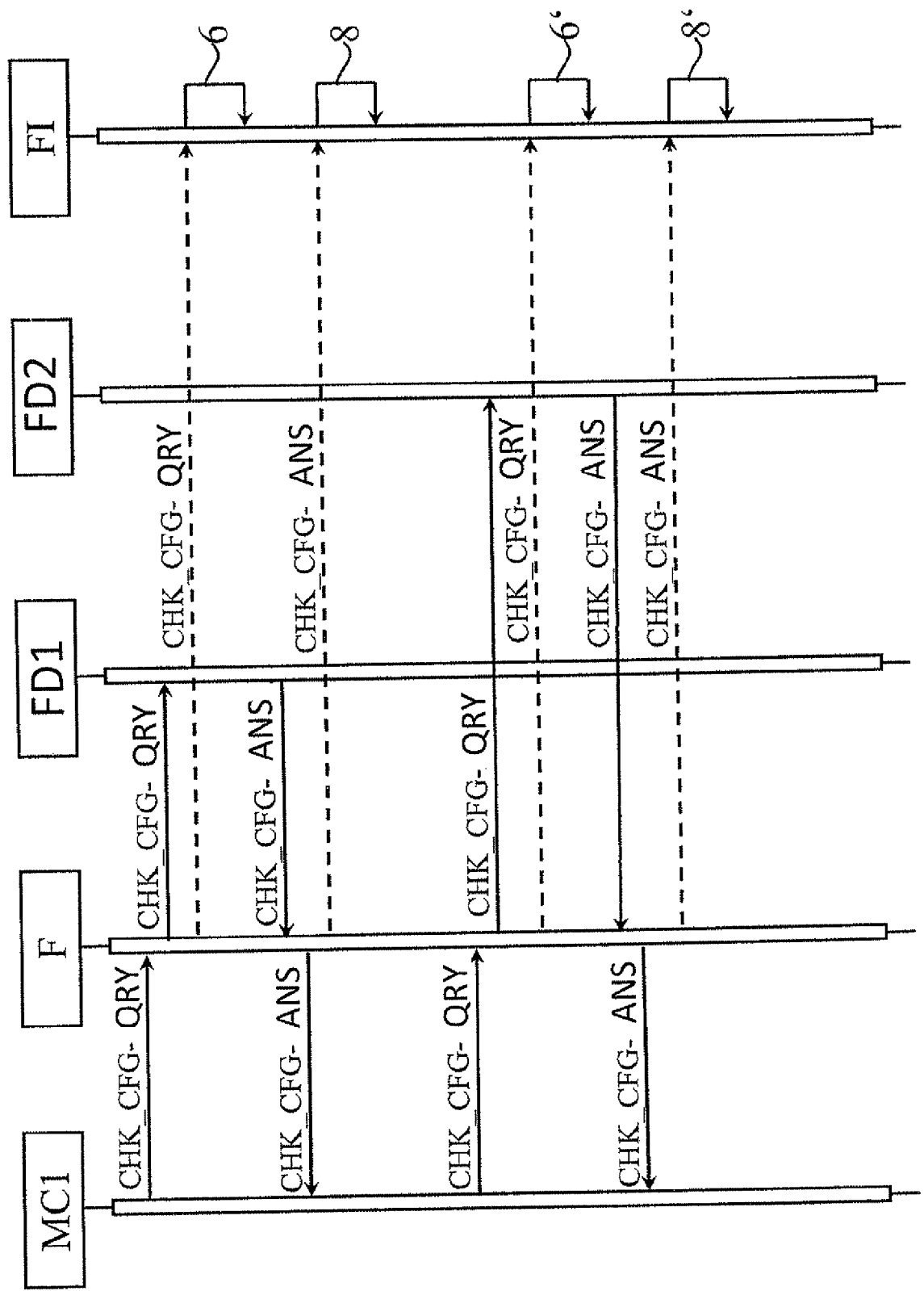
FIG. 2 shows by way of example, a representation of the steps of tapping and registering configuration information transmitted in a "Chk_Cfg telegram".

In the following, in reference to FIG. 2, the steps of the tapping (step A) and the registering (step B) are explained based on the transmission of a "Chk_Cfg telegram" via fieldbus F as an example. In such case, a network configuration, as presented in FIG. 1, is assumed. In FIG. 2 the communication planes of superordinated unit MC1, fieldbus F, field device FD1, field device FD2 and fieldbus interface FI, are each represented as vertically extending blocks. The telegrams transmitted via fieldbus F are, in each case, presented as solid line arrows, while the tapping of individual telegrams by the fieldbus interface FI is presented, in each case, by dashed arrows, which lead from fieldbus F to fieldbus interface FI.

In the upper half of FIG. 2 a communication between superordinated unit MC1 and field device FD1 is presented. In the illustrated example, superordinated unit transmits a "Chk_Cfg-query telegram" to field device FD1 via fieldbus F. This is presented in FIG. 2 by the two solid arrows marked "CHK_CFG-QRY." As explained above in reference to the initializing phase of a Profibus® field device, the configuration of field device FD1 is transmitted in such a "Chk_Cfg-query telegram". In such case, it is configuration information relative to the cyclic data traffic on fieldbus F. Fieldbus interface FI taps the data traffic on fieldbus F and also accordingly taps the "Chk_Cfg-query telegram". This is presented in FIG. 2 by the dashed arrow marked "CHK_CFG-QRY." In fieldbus interface FI, the tapped information is then checked to determine whether it is configuration information relative to the cyclic data traffic on fieldbus F. Since this is the case, this configuration information is registered and stored in the memory of fieldbus interface FI. These steps are presented in FIG. 2 by the recycling arrow 6.

In response to the "Chk_Cfg-query telegram", field device FD1 transmits a "Chk_Cfg-response telegram" to superordinated unit MC1 via fieldbus F. This is represented in FIG. 2 by the two solid arrows marked "CHK_CFG-ANS." As explained above in reference to the initializing phase of a Profibus® field device, the receipt of the configuration is confirmed in such a "Chk_Cfg-response telegram". Fieldbus interface FI, in turn, taps the "Chk_Cfg-response telegram". This is presented in FIG. 2 by the dashed arrow marked "CHK_CFG-ANS.". If the configuration of field device FD1 transmitted in the "Chk_Cfg-query telegram" is not correct, then field device FD1 communicates this in response to a diagnostic query ("Slave_Diag-query telegram") subsequently transmitted by superordinated unit MC1. This diagnostic query has already been explained above in reference to the Profibus® state machine. If the transmitted configuration is correct, then it is transferred to field device FD1. The tracing of these steps through fieldbus interface FI is presented in FIG. 2 by the recycling arrow 8.

Only the transmission of the "Chk_Cfg-query telegram" and the associated "Chk_Cfg-response telegram" between superordinated unit MC1 and field device FD1 are presented in FIG. 2. The additional telegrams transmitted between superordinated unit MC1 and field device FD1 via fieldbus F during an initializing phase of field device FD1 are not presented. A tapping of such telegrams, especially "Set_Prm telegrams", as well as further telegrams (for example, transmitted in the context of the cyclic data traffic) and the verifying and, in given cases, tapping and storing of configuration information contained therein occurs in a corresponding manner.

A communication between superordinated unit MC1 and field device FD2 is presented in the lower half of FIG. 2. Again, a "Chk_Cfg-query telegram" is transmitted from superordinated unit MC1 to field device FD2 via fieldbus F and the receiving of the same by field device FD2 is confirmed through a transmission of a "Chk_Cfg-response telegram" to superordinated unit MC1 via fieldbus F. Both the "Chk_Cfg-query telegram" as well as the "Chk_Cfg-response telegram" are tapped by fieldbus interface FI. Regarding this communication between superordinated unit MC1 and field device FD2, reference is taken to the explanations above, which are applicable in a corresponding manner. Again, the tapped information is then checked by fieldbus interface FI to determine whether it is configuration information relative to the cyclic data traffic on fieldbus F. Since this is the case in both the "Chk_Cfg-query telegram" as well as the "Chk_Cfg-response telegram", this configuration information is registered and stored in the memory of fieldbus interface FI. This is represented in FIG. 2 by the two recycling arrows 6' and 8'.

The invention claimed is:

1. A method for operating a fieldbus interface connected to a fieldbus of process automation technology, wherein the method comprises the steps of:

tapping data traffic on the fieldbus by the fieldbus interface; and registering tapped configuration information relative to cyclic data traffic on the fieldbus by the fieldbus interface.

2. The method as claimed in claim 1, wherein:

the configuration information relative to the cyclic data traffic on the fieldbus contains information concerning the outputs, which, in the context of process control, are delivered from a superordinated unit to a field device associated with the superordinated unit; and/or information concerning the inputs, which, in the context of process control, are obtained by a superordinated unit from a field device associated with the superordinated unit.

3. The method as claimed in claim 1, wherein:

the configuration information relative to the cyclic data traffic on the fieldbus contains information concerning device parameters, especially frequency of the alternating current grid applied for supplying devices connected to the fieldbus.

4. The method as claimed in claim 1, wherein:

registered configuration information relative to the cyclic data traffic on the fieldbus is stored by the fieldbus interface.

5. The method as claimed in claim 1, wherein:

the data traffic on the fieldbus is continuously tapped by the fieldbus interface at least during an initializing phase of at least one field device connected to the fieldbus.

6. The method as claimed in claim 1, further comprising the step of:

transmitting registered configuration information relative to the cyclic data traffic on the fieldbus by the fieldbus interface to at least one communication unit, which is in communication with the fieldbus interface.

7. The method as claimed in claim 6, wherein:

registered configuration information relative to the cyclic data traffic on the fieldbus is transmitted via the fieldbus interface to a computer supported, plant asset management system, a computer supported, state monitoring system and/or a computer supported system for plant optimization.

8. The method as claimed in claim 1, wherein:

the fieldbus is embodied according to the Profibus® standard.

9. The method as claimed in claim 8, wherein:

the fieldbus interface registers tapped configuration information, which is transmitted in a "Chk_Cfg telegram" and/or in a "Set_Prm telegram".

10. A fieldbus interface for connecting to a fieldbus of process automation technology, wherein the fieldbus interface is embodied in such a manner that data traffic on the fieldbus is tappable through such fieldbus interface and tapped configuration information relative to cyclic data traffic on the fieldbus can be registered.

* * * * *